M. B. NYE.
AUTOMATIC CHECK VALVE MECHANISM.
APPLICATION FILED NOV. 4, 1918.
1,339,128.
Patented May 4, 1920.
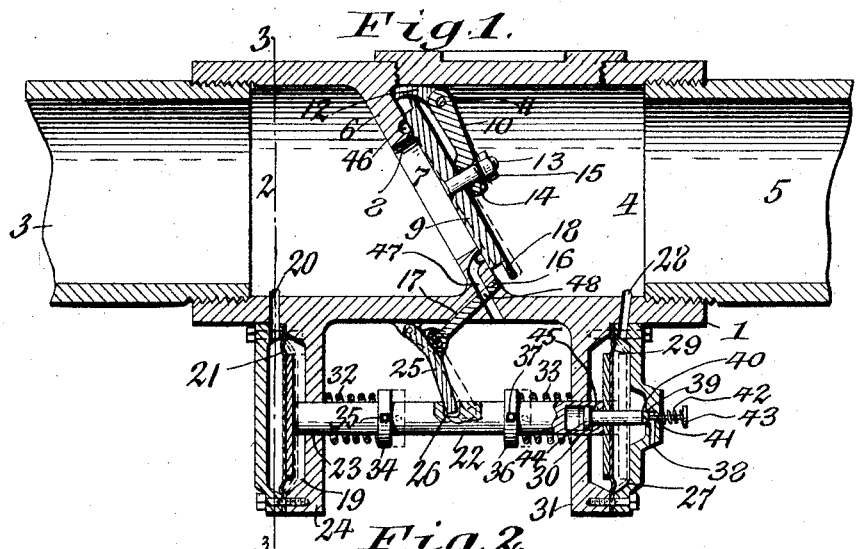
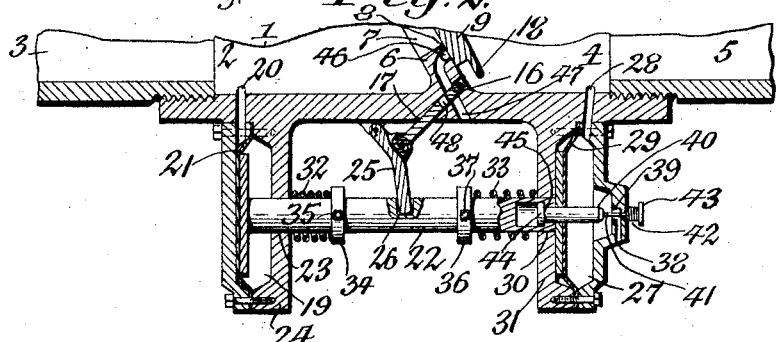
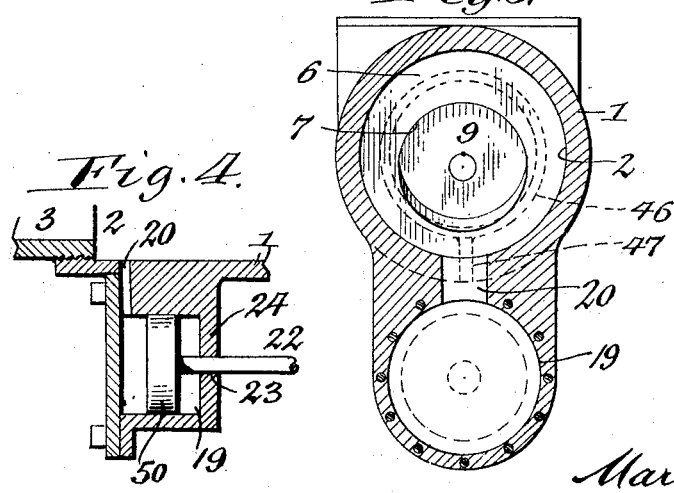
Inventor
Mark B. Nye
by Geyer & Popp
Attorneys

UNITED STATES PATENT OFFICE.

MARK B. NYE, OF BUFFALO, NEW YORK.

AUTOMATIC CHECK-VALVE MECHANISM.

1,339,128.  Specification of Letters Patent.  Patented May 4, 1920.

Application filed November 4, 1918. Serial No. 260,977.

*To all whom it may concern:*

Be it known that I, MARK B. NYE, a citizen of the United States, residing at Buffalo, in the county of Erie and State of New York, have invented new and useful Improvements in Automatic Check - Valve Mechanism, of which the following is a specification.

This invention relates to an automatic check valve mechanism which is provided with means for detecting any leak occasioned by an imperfect seating of the closure-member against its seat and also provided with relief means for preventing return flow of fluid when the pressure on the discharge side of the check valve exceeds that on the supply side of the same.

The common type of check valve heretofore in use does not permit of determining whether the closure-member has properly engaged the seat of the valve to prevent non-return of fluid from the discharge or low pressure side of the valve to the inlet or high pressure side of the same with the result that when such valves are defective and do not seat properly and permit leakage between the closure member and its seat it frequently happens that objectionable fluid is permitted to return from the discharge side of the check valve to the inlet side thereof and thereby contaminate the source of supply, so that the use of this water for domestic purposes is impaired. In many industrial plants the outlet side of the check valve is connected with sprinkling systems having storage tanks in which pressure is maintained in excess of the pressure within the service pipe through which the fluid is supplied to the inlet of the check valve, and the outlet of the check valve is also in many instances connected with tanks containing chemicals, so that it is highly important to prevent the back-flow of any foul, poisonous or contaminated fluid from such tanks into the main service pipe, as the same is detrimental to the health of a community which draws its main supply of water from the same source.

Furthermore, it frequently happens that a pressure is set up in the piping connected with the outlet side of a check valve which is greater than that on the inlet side thereof due to inadvertent opening of valves which connect the piping on the outlet side of the check valve with boilers, pumps or tanks under high pressure, in which case it is desirable to prevent the passage of any water from the outlet side of the check valve to the inlet side thereof in order to avoid polluting the water in the main source of supply.

It is the object of this invention to provide an automatic check valve mechanism with means for detecting leakage in the same and also to afford a relief from the delivery side of the check valve to the outer atmosphere in the event of the pressure in the outlet line exceeding that of the inlet line, also to provide means for facilitating the opening of the check valve, and to accomplish this by means which are comparatively simple and inexpensive in construction and reliable and efficient in operation.

In the accompanying drawings:

Figure 1 is a longitudinal section of a check valve mechanism embodying one form of my invention and showing the main valve member in its closed position. Fig. 2 is a similar view, showing the position of the parts when the pressure in the outlet line exceeds that of the inlet line. Fig. 3 is a cross section taken on line 3—3, Fig. 1. Fig. 4 is a fragmentary section, showing a modified form of pressure chamber.

Similar characters of reference indicate corresponding parts throughout the several views.

1 represents the body of the check valve which is preferably of tubular form and provided at one end with a fluid inlet 2 which is connected with the service or supply pipe 3, and at its opposite end with a fluid outlet 4 which is connected with a discharge or delivery pipe 5. Between its inlet and outlet, the body is provided internally with an inclined partition 6 containing a port or passage 7 and a flat valve-seat 8 on that side of the partition which faces toward the outlet of the valve body. 9 represents a main closure or valve member which in the present instance is constructed in the form of a disk and which is adapted to engage with its flat front side against the valve seat 8 on the partition for closing said port and preventing the return passage of fluid from the discharge to the inlet side of the body, while upon raising this valve disk from said seat, a free passage through the valve body is afforded from the inlet to the discharge side of the same. This valve disk is guided in its movements toward and from its seat preferably by means of a vertically-swinging rock arm 10 which is arranged in rear of the valve disk and pivoted at its upper end by means of a horizontal transverse pin 11 to a lug 12 on the adjacent part of the body while its lower end is pivotally connected by a swivel joint with the central part of the rear side of the valve disk, this last mentioned connection being preferably produced by means of a coupling bolt 13 secured to the central part of the valve disk and passing through an opening 14 in the lower end of the rock lever, so that the latter is confined between the rear side of this valve disk and the nut 15 of the bolt, as shown in Fig. 1. By this means the valve disk is free to turn and adapt itself to the valve seat and also permits of tilting this valve relatively to its seat for a purpose which will presently appear.

It frequently happens that the valve disk sticks to its seat which together with the smaller area of this disk which is exposed on its inlet side to the fluid pressure as compared with the greater area on the outlet side of the same, prevents the prompt and quick opening of this valve disk and therefore causes an unnecessary reduction of pressure on the outlet side of the check valve and the piping connected therewith which in many cases is objectionable. Means have therefore been provided which facilitate the opening of the valve disk when fluid is to be withdrawn from the piping connected with the outlet side of the check valve and thus avoid any objectionable consequences. The preferred means for accomplishing this purpose which are shown in the drawings are constructed as follows:

16 represents a shifting pin which is guided in an inclined opening 17 in the lower part of the valve body and is adapted to engage its inner end within the outlet of the valve body against a bearing point or shoulder arranged on the lower part of the valve disk, which is diametrically opposite to the pivotal connection between the valve rock lever 10 and the valve body. This bearing point or shoulder is preferably formed by means of an annular rim or flange 18 arranged on the periphery of the valve disk, which causes the latter when turned on its coupling bolt 13 to always present one part or another of its rim to the inner end of the shifting pin so as to serve as a bearing point or abutment with which this pin may engage. When the valve disk is stuck on its seat and the shifting pin is pushed upwardly, the upper end of this pin engages with the lower part of the rim and causes the valve disk to be tilted during which movement its lower part is moved away from the seat while the upper end thereof rocks on the upper part of the valve seat as a fulcrum, thereby causing the initial part of the opening movement of the valve to be effected easily and enabling the fluid pressure on the inlet side thereof to complete this opening movement freely and quickly without undue reduction of pressure on the outlet side of the check valve.

The power for actuating this shifting pin for lifting the valve disk is derived from the pressure of the fluid in the inlet end of the valve body, for which purpose means are provided which, as shown in Figs. 1, 2 and 3, may comprise a front or high-pressure chamber 19 communicating by means of a passage 20 with the inlet end of the valve body and having a movable wall 21 which in this instance is constructed in the form of a flexible or pliable diaphragm. On its outer side this diaphragm is connected with a shifting rod 22 which is preferably arranged parallel with the axis of the valve body and is guided with its front part in a guide opening 23 formed in a bracket 24 which is connected with the adjacent part of the valve body and this pressure chamber. 25 represents an intermediate rock lever which is pivoted at its upper end to the underside of the valve-body and engages at its lower end with a notch 26 in the shifting rod while its intermediate part is connected with the outer end of the shifting pin 16.

When the valve disk is closed the shifting pin is retracted and the movable wall or diaphragm 21 is in its central position. Upon now opening a valve in the piping connected with the outlet of the valve body, so that the pressure on this side of the check valve is less than that on the inlet side of the same, pressure will be exerted simultaneously against the front side of the valve disk and against the inner side of the diaphragm 21, and if at this time the valve disk does not open promptly due to sticking or to the difference in the areas on the front and rear sides of the valve disk which are exposed to opposing fluid pressure, the forward movement of the shifting rod 22 under the action of the fluid pressure against the front diaphragm 21 will cause the shifting lever 25 to be turned forwardly and the shifting pin 16 to be pushed upwardly and inwardly so that the latter engages with the lower portion of the rim on the valve disk and pries the same by a tilting action from its seat, after which the main stream of water bearing against this valve disk will now promptly complete the opening of the same and prevent undue reduction of pressure on the outlet side of the check valve.

After the valve disk has been thus opened, the shifting pin 16 is again retracted into its inoperative position to permit the valve disk to again drop by gravity into engagement with its seat and automatically close the port in the partition when the withdrawal of fluid from the outlet side of the check valve ceases. Various means may be provided for thus retracting the shifting pin and the parts associated therewith, but those which are shown in Figs. 1 and 2 for this purpose comprise a low or outlet pressure chamber 27 communicating by means of a passage 28 with the outlet of the valve body and having a movable rear wall 29 which is constructed in the form of a diaphragm. The rear end of the shifting rod 22 connects with the outer side of this last-mentioned diaphragm and is also guided in an opening 30 formed in a bracket 31 which is connected with the adjacent part of the valve body and the low pressure chamber. As the fluid pressure from the inlet of the valve body moves the front diaphragm forwardly, the rear diaphragm is also moved forwardly by reason of the shifting rod 22 which connects the same, but after the shifting pin 16 has loosened the valve disk and the water pressure on the inlet and outlet sides of the check valve have been equalized or substantially so, the increase in water pressure on the outlet side of this valve entering the low pressure chamber, causes the rear diaphragm therein to be again pushed rearwardly into its normal position, thereby causing the shifting pin 16 to be withdrawn into its retracted position in which the valve disk is free to engage its seat when the pressure of the water within the valve body is such as to permit of this. In order to further insure holding the shifting rod and the two diaphragms connected therewith in their central position, spring means are provided which preferably comprise two springs 32, 33, the former surrounding the front end of the shifting rod and bearing at one end against the front bracket 24 and at its opposite end against a collar 34 which is adjustably secured to the shifting rod by means of a set screw 35, and the latter surrounding the rear end of the shifting rod and bearing at one end against the rear bracket 31 and at its opposite end against a collar 36 which is adjustably secured to the shifting rod by means of a set screw 37, as shown in Figs. 1 and 2.

In order to avoid undue back pressure on the valve disk, in the event that the pressure in the piping connected with the outlet end of the check valve is in excess of the pressure on the inlet end thereof, relief or vent means are provided which operate to automatically discharge fluid from the outlet side of the check valve and thus relieve the pressure therein. The preferred form of the means for accomplishing this purpose as shown in Figs. 1 and 2 are constructed as follows:

38 represents a relief or vent passage formed in the rigid wall of the rear or low pressure chamber and having its inner end constructed to form a valve seat 39. 40 represents a relief valve which closes outwardly against the vent valve seat and opens inwardly and which is yieldingly held against this seat by means of a valve stem 41 connected with the outer end of the relief valve and passing through the adjacent fixed wall of the low pressure chamber, and a spring 42 bearing at one end against the outer side of this fixed wall and at its other end against a head 43 on this valve stem. A slack connection is provided between this relief or vent valve and the adjacent movable wall or diaphragm of the low pressure chamber and the shifting rod connected therewith, so as to permit this diaphragm and the parts connected therewith to move forwardly from their central position independently of the vent valve but compel the vent valve to move with this diaphragm and associated parts when the same move from their central position rearwardly and thereby cause the opening of the vent valve. This slack connection, as shown in Figs. 1 and 2, preferably consists in extending the front end of the relief valve through an opening in the rear diaphragm and into the rear hollow end of the shifting rod and providing the front end of the relief valve with a head 44 forming a forwardly-facing shoulder thereon which is adapted to engage with a rearwardly-facing shoulder 45 in the bore of the shifting rod. It will be apparent from this construction, that when the rear diaphragm moves forwardly from its central position shown by full lines in Fig. 1, to its foremost position indicated by dotted lines in the same figure, that the relief or vent valve will be unaffected by such movement and remain in its closed position, but when an excessive pressure occurs in the outlet side of the check valve which might cause the joint between the valve disk and the partition to leak, then the rear diaphragm will be shifted rearwardly by such fluid pressure from the position shown by full lines in Fig. 1 to the position shown by full lines in Fig. 2, whereby the relief or vent valve owing to its connection with this diaphragm and adjacent parts, will be opened automatically and permit the fluid under pressure in the outlet side of the check valve to escape through the relief or vent port to the outer atmosphere. After the normal pressure of the fluid on the outlet side of the valve disk has been again restored, the spring 32 will again move the shifting rod and the diaphragms connected therewith forwardly into their central positions and the spring 42 will close the relief valve.

Means are provided for conducting to the exterior of the check valve any water from the outlet side of the same which may creep into the joint between the valve disk and its seat due to imperfect contact between the same and thereby prevent such water from reaching the inlet side of the check valve and contaminating the source of supply. The preferred means for accomplishing this purpose are combined with the means whereby the valve disk is automatically opened in case the same tends to stick on its seat. As shown in Figs. 1, 2 and 3, the means whereby leakage in the joint between the valve and its seat is carried to the exterior of the valve body comprises an annular leak-groove or channel 46 formed in the seat of the valve disk around the port 7, a drain passage 47 extending from the lower part of this leak groove to the underside of the valve body and intersecting the opening 17 in which the shifting pin is guided, and a port 48 formed in this shifting pin and adapted to move into and out of register with the drain passage for the purpose of placing the leakage groove in or out of communication with the external atmosphere. In the normal or closed position of the valve disk in which the two diaphragms are arranged in their central position and the shifting pin is in its retracted position, the upper or inner end of the latter is arranged at a distance from the rim of the valve disk and its port is arranged in line with the drainage passage, as shown in Fig. 1. If at this time the valve disk does not engage properly with its seat by reason of any sediment or incrustation between the valve disk and its seat, and thus produces a leaky joint between the same, then any fluid from the outlet side of the valve body which creeps along the joint between the valve disk and its seat will enter the leakage groove before getting to the port 17 and then pass out through the drain passage in the valve body and through the port in the shifting pin to the exterior of the valve where it is wasted and prevented from reaching the pure fluid on the inlet side of the check valve and contaminating the same. When the shifting pin is pushed forwardly by the pressure of the fluid on the inlet side of the valve body against the front diaphragm, this movement is so determined that the port in the shifting pin first moves forwardly out of register with the drain passage and then its inner end engages with the rim of the valve disk and lifts the same from its seat, thereby preventing any fluid which may enter the leakage groove while the valve disk is open from escaping through the drain passage. The shifting pin remains in this forward position so long as the valve disk is open and the pressure of the fluid on the front diaphragm is greater than the pressure against the rear diaphragm, which difference usually exists during the normal operation of the parts, but when fluid is no longer drawn from the piping connected with the outlet end of the check valve and the pressure against both diaphragms is alike, the spring means return the shifting rod and the diaphragms to their central position and retract the shifting pin into a position in which its port registers with the drain passage and permits the valve disk to again engage its seat automatically.

Instead of making the movable walls of the pressure chamber in the form of flexible diaphragms, as shown in Figs. 1, 2 and 3, each of these movable walls may be constructed in the form of a piston. In Fig. 4 is shown a construction in which the movable wall of the front or lower pressure chamber is constructed in the form of such a piston 50 and a similarly constructed piston may be employed in place of the flexible diaphragm of the rear or low pressure chamber.

From the foregoing explanation, the advantages to be derived from this invention will now be apparent, viz: that a positive opening of the valve disk or main closure member will be effected in the event that the same has a tendency to stick, thereby avoiding undue reduction in the fluid pressure on the outlet side of the check valve as compared with the fluid pressure on the inlet side of the same, a relief of the back fluid pressure against the valve disk is afforded in the event of excess pressure on the outlet side of the check valve as compared with its inlet side; and in the event of any leakage in the joint between the valve disk and its seat such leakage is carried to the exterior of the check valve instead of being permitted to reach the original source of fluid supply and contaminating the same, thereby insuring purity of the main fluid supply and guarding the health of the public which otherwise would be endangered if foul water or other objectionable fluid were permitted to reach the source from which the domestic supply is drawn.

I claim as my invention:

1. An automatic check valve mechanism, comprising a valve body having a fluid inlet and a fluid outlet, a valve seat arranged between said inlet and outlet and facing toward said outlet, a leak groove arranged in said valve seat, and a drain passage leading from said groove to the exterior of said valve chamber, a valve disk movable toward and from said seat and leak groove and provided with a bearing point at its edge, a rock arm pivoted on said body within the outlet thereof and opposite the bearing point of the valve disk and pivotally connected with the central part of said disk, and a shifting member adapted to engage said bearing point and be moved by fluid pressure in the inlet of said body.

2. An automatic check valve mechanism, comprising a valve body having a fluid inlet and a fluid outlet, a valve seat arranged between said inlet and outlet and facing toward said outlet, a leak groove arranged in said valve seat, and a drain passage leading from said groove to the exterior of said valve chamber, a valve disk movable toward and from said seat and leak groove and provided with a bearing point at its edge, a rock arm pivoted on said body within the outlet thereof and opposite the bearing point of the valve disk and pivotally connected with the central part of said disk, and a shifting member adapted to engage said bearing point and be moved by fluid pressure in the inlet of said body and having a port adapted to be moved into and out of register with said drain passage.

3. An automatic check valve mechanism, comprising a valve body having a fluid inlet and a fluid outlet, a valve seat arranged between said inlet and outlet and facing toward said outlet, a leak groove arranged in said valve seat, and a drain passage leading from said groove to the exterior of said valve body, a valve disk movable toward and from said seat and provided with a marginal rim part of which is adapted to form a bearing point which faces said valve seat, a rock arm pivoted on said body within the outlet thereof diametrically opposite said bearing point and pivotally connected with the central part of said disk, and a shifting member actuated by the pressure of the fluid in the inlet of said body and adapted to engage said bearing point.

4. An automatic check valve mechanism, comprising a body having a fluid inlet, a fluid outlet, a valve seat arranged between said inlet and outlet and facing toward said outlet, a leak groove arranged in said valve seat and a drain passage leading from said leak groove to the exterior of said body, a valve member engaging with said seat and provided with a port which is adapted to be placed in and out of register with said drain passage, a pressure chamber communicating with said inlet and having a movable wall, and a connection between said wall and said valve member.

5. An automatic check valve mechanism, comprising a body having a fluid inlet, a fluid outlet, a valve seat arranged between said inlet and outlet and facing toward said outlet, a leak groove arranged in said valve seat and a drain passage leading from said leak groove to the exterior of said body, a valve member engaging with said seat and provided with a port which is adapted to be placed in and out of register with said drain passage, a pressure chamber communicating with said inlet and having a movable wall adapted to be moved in one direction by the fluid pressure in said inlet, a spring for moving said wall in the opposite direction, and a connection between said wall and said valve member.

6. An automatic check valve, comprising a body having a fluid inlet, a fluid outlet and a valve seat facing said outlet, a valve disk movable toward and from said seat, a pressure chamber communicating with said inlet and having a movable diaphragm which is moved in one direction by the pressure in said inlet, a shifting rod engaging said diaphragm, a spring operating to move said rod and diaphragm in the opposite direction, a lever pivoted on said body and engaging with said rod, and a pin slidable on said body and connected at one end with said lever and adapted to engage its other end with said disk.

7. An automatic check valve mechanism, comprising a body having a fluid inlet, a fluid outlet and a valve seat arranged between said inlet and outlet and facing said outlet, a closure member adapted to engage said seat, an inlet chamber connected with said inlet and having a movable wall, an outlet chamber connected with said outlet and having a movable wall, and means for transmitting motion from said walls to said closure member.

8. An automatic check valve mechanism, comprising a body having a fluid inlet, a fluid outlet and a valve seat arranged between said inlet and outlet and facing said outlet, a closure member adapted to engage said seat, an inlet chamber connected with said inlet and having a movable wall, an outlet chamber connected with said outlet and having a movable wall, means for transmitting motion from said walls to said closure member comprising a connecting rod connected with opposing sides of said walls, a lever engaging said rod, and a pin slidable in said body and engaging its opposite ends with said closure member and said lever.

9. An automatic check valve mechanism, comprising a body having a fluid inlet, a fluid outlet and a valve seat arranged between said inlet and outlet and facing said outlet, a closure member adapted to engage said seat, an inlet chamber connected with said inlet and having a movable wall, an outlet chamber connected with said outlet and having a movable wall, means for transmitting motion from said walls to said closure member, and means for controlling communication between said outlet chamber and the atmosphere.

10. An automatic check valve mechanism, comprising a body having a fluid inlet, a fluid outlet and a valve seat arranged between said inlet and outlet and facing said outlet, a closure member adapted to engage said seat, an inlet chamber connected with said inlet and having a movable wall, an outlet chamber connected with said outlet and having a movable wall, means for transmitting motion from said walls to said closure member, and means for controlling communication between said outlet chamber and the atmosphere comprising a vent port arranged in said outlet chamber, a vent valve for controlling said vent port and having a slack connection with said movable wall of the outlet chamber, and yielding means for holding said vent valve in its closed position.

11. An automatic check valve comprising a body having a fluid inlet, a fluid outlet and a valve seat between said inlet and outlet and facing toward the latter, a valve member adapted to engage said seat for controlling the flow of fluid through said body, an outlet chamber communicating with said outlet and having a movable wall and a vent port, and a vent valve for controlling said vent port and actuated by said movable wall.

MARK B. NYE.